United States Patent Office 3,240,504
Patented Mar. 15, 1966

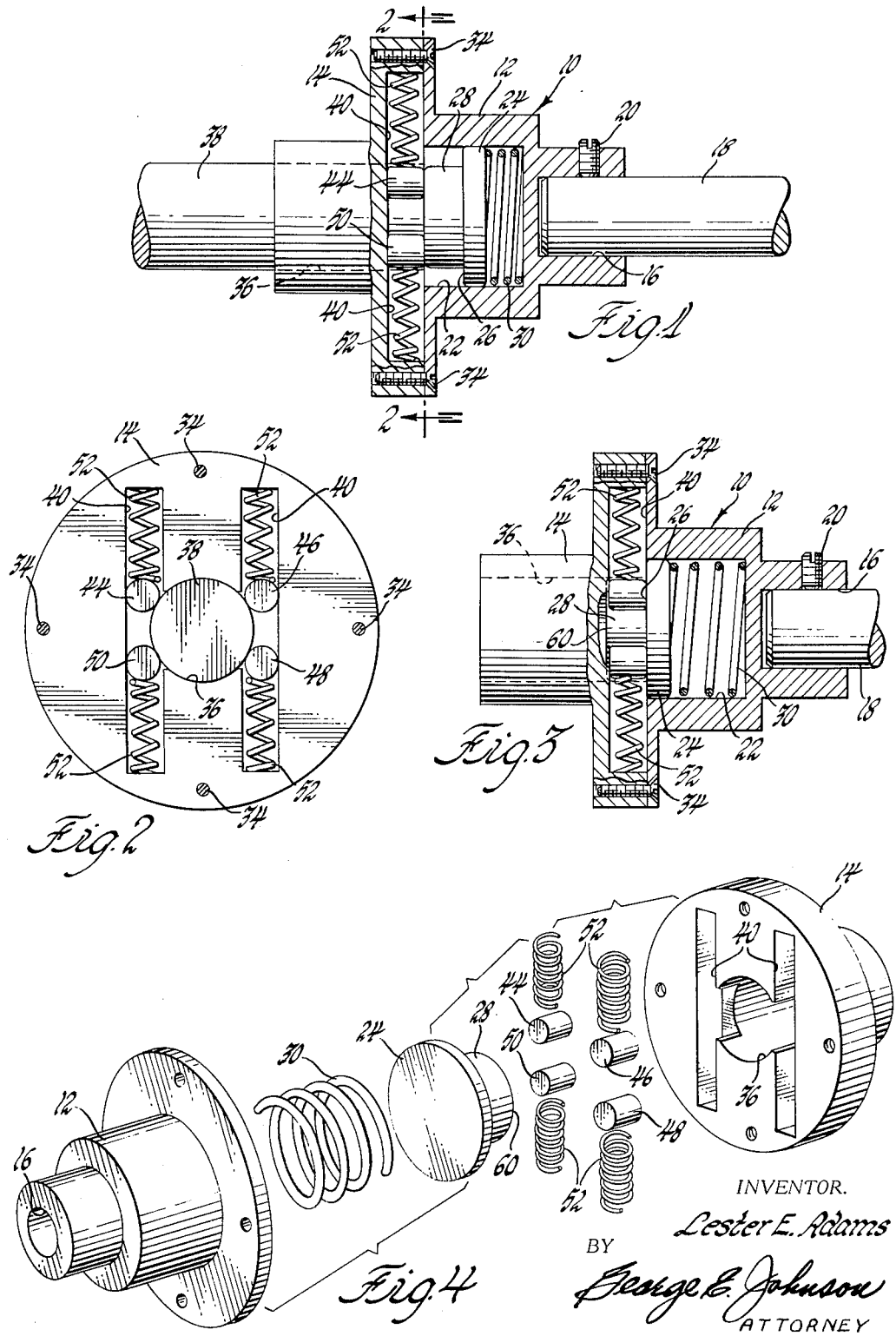

3,240,504
QUICK DISCONNECT COUPLING
Lester E. Adams, Oak Creek, Wis., assignor to General Motors Corporation, Detroit, Mich., a corporation of Delaware
Filed June 16, 1964, Ser. No. 375,565
6 Claims. (Cl. 279—9)

This invention relates to coupling devices and more particularly to couplings or checks for connecting rotatable members such as shafts or for retaining tools in operative relation with rotative driver devices. Drills, reamers and similar tools may be retained on driver units and quickly removed or replaced by means of devices such as disclosed herein.

An object of the present invention is to provide an improved coupling for connecting two rotative and relatively axially movable members and in which rollers adapted to grip or hold are positively retained by the coupling during connection and disconnection of the two members by relative axial movement of the latter.

A feature of the present invention is a coupling having at least one spring pressed roller adapted to supply a wedge action in transferring torque from one rotative member to another and means yieldingly urged to retain that roller in potential operating position when the two rotative members are disconnected.

These and other important features of the invention will now be described in detail in the specification and then pointed out more particularly in the appended claims.

In the drawings:

FIGURE 1 is an elevation view of driver and driven members connected by a coupling according to the present invention, the coupling being partially in section;

FIGURE 2 is a sectional view looking in the direction of the arrows 2—2 in FIGURE 1;

FIGURE 3 is an elevation part-sectional view of a driver member and a coupling as shown in FIGURE 1 but with the driven member withdrawn from the coupling; and FIGURE 4 is an exploded view in perspective showing parts of the coupling independent of drive and driven members.

In FIGURE 1 of the drawings a coupling of this invention is generally shown at 10 and this coupling comprises a casing made up of two parts 12 and 14. The part 12 is recessed as at 16 tightly to receive one end of a shaft 18 which is held therein by means of a set screw 20. A chamber 22 is also defined in the casing in the part 12 and it is adapted to accommodate a movable plunger 24 having an enlarged head presenting an annular shoulder or stop means 26. The plunger also has a reduced diameter portion 28 and spring means 30 is located in the chamber 22 urging the plunger 24 in a direction away from the recess 16.

The portion 14 of the coupling is held to the portion 12 by means of peripherally located and spaced screws 34. The portion 14 is also recessed as at 36 rotatably to receive one end of a shaft 38 and the recess 36 is substantially of the same diameter as that of the plunger portion 28. It will be noted that the shafts 18 and 38 as well as the chamber 22 obviously are coaxial.

In the embodiment shown, the portion 14 of the casing is provided with pockets 40 tangential to the recesss 36 of the portion 14 in such a way as to cooperate either with the periphery of the shaft 38 or the reduced portion 28 of the plunger to define wedge shaped pockets for four rollers 44, 46, 48 and 50. Two of these rollers are movable in each pocket 40 and each roller is urged toward the recess 36 by means of a coiled spring 52. It will be noted that the pockets 40, are parallel but obviously this is not essential as will be clear as the description proceeds.

Assuming that the shaft 18 is a drive shaft and that the portion 12 of the casing is fixed to the shaft 18 by means of the screw 20, the insertion of the shaft 38 into the recess 36 will displace the plunger 24 to the right as viewed in FIGURE 1 and compress the spring 30. In this situation, the rollers 44, 46, 48 and 50 will be in engagement with the surface of the inserted shaft 38, and the wedge action of the rollers will enable the shaft 18 to rotate shaft 38 in either direction. The rollers 44 and 48 will be also to effect rotation of the shaft 38 in one direction—counterclockwise as viewed in FIGURE 2—and the rollers 46 and 50 will be capable to effect rotation of the shaft 38 in the other or clockwise direction.

Assuming that a one-way rotation only is required, two of the cooperative rollers could be eliminated. For example, if the rollers 44 and 48 were eliminated, the rollers 46 and 50 would effect rotation of the shaft 38 in one direction whereas the reverse rotation of the shaft 38 independent of the driven shaft would be possible. It is also clear that only one roller need be used to effect a drive in one direction although multiple rollers are more effective.

When the shaft 38 is withdrawn from the coupling, the plunger portion 28 takes its place as seen in FIGURE 3. The roller retaining action of the shaft 38 is eliminated but the plunger portion 28 now performs that function and does that automatically. It is preferred that the edge 60 of plunger portion 28 be slightly rounded thereby obviating the necessity of precise machining and also to avoid abutting the ends of the rollers.

I claim:

1. A coupling for connecting two members coaxially, said coupling comprising a casing, means for mounting one portion of said casing in non-rotative relation on one of said members, an opposite portion of said casing defining a cylindrical recess for receiving the other of said two members, a chamber in said casing and located between said portions and in axial alignment with said recess, at least one pocket formed in said casing and extending tangential to the wall of said recess, a roller movable in said pocket, spring means in said pocket urging said roller toward said recess, a plunger in said chamber and having a shoulder facing said pocket, and spring means in said chamber urging said plunger toward said pocket and roller.

2. A coupling comprising a casing, opposite portions of said casing having recesses receptive of facing coaxial ends of rotative members, one of said opposite portions having means for holding the corresponding rotative member in fixed relation therewith, a chamber in said casing arranged between and in coaxial relation with said recesses and having a diameter greater than that of one of said recesses, a pocket in said casing tangential to the wall of said one recess, a roller movable in said pocket with its axis parallel with the axis of said one recess, spring means in said pocket urging said roller toward said one recess, a plunger in said chamber and having an annular shoulder facing said pocket, and spring means in said chamber urging said plunger toward said pocket.

3. A coupling as set forth in claim 2 in which said plunger has a reduced diameter portion of such size as slidably to fit within said one recess, and in which said annular shoulder has a diameter greater than that of said one recess and is adapted to abut a surface of said casing when said coupling is inoperative.

4. A coupling as set forth in claim 2 in which an added tangential pocket, roller and spring means are cooperatively arranged so that the rollers are urged in the same direction about the axis of said chamber.

5. A coupling as set forth in claim 2 in which multiple tangential pockets are provided, each of said pockets enclosing a roller and spring means acting thereon, some of said rollers being urged in one direction about the axis of said chamber by their corresponding spring means, and others of said rollers being urged in the other direction about the axis of said chamber by their corresponding spring means.

6. A coupling for connecting two members coaxially, said coupling comprising a casing one end of which has a recess for receiving one of said members, a chamber in said casing and coaxial with said recess, pockets in said casing extending tangential to the wall of said recess, each of said pockets enclosing a roller and a spring urging said roller toward said recess, the axis of said roller being parallel with the axis of said recess, a plunger in said chamber, a spring in said chamber urging said plunger toward said recess, the latter and one portion of said plunger being substantially of the same diameter, said one portion being adapted to slide into said recess, and stop means on said plunger to prevent the plunger from moving beyond engagement with the rollers.

References Cited by the Examiner
UNITED STATES PATENTS

| | | | |
|---|---|---|---|
| 870,151 | 11/1907 | Abell | 81—59.1 |
| 2,127,003 | 8/1938 | Nash | 81—59.1 |
| 2,322,877 | 6/1943 | Parker | 251—149.6 |
| 2,770,474 | 11/1956 | Krapp | 251—149.6 |

ROBERT C. RIORDON, *Primary Examiner.*